(12) United States Patent  
Olivés et al.

(10) Patent No.: US 11,811,527 B2
(45) Date of Patent: Nov. 7, 2023

(54) DETECTING CONTROL INFORMATION COMMUNICATED IN FRAME USING A NEURAL NETWORK

(71) Applicant: NOKIA TECHNOLOGIES OY, Espoo (FI)

(72) Inventors: Jean-Luc Olivés, Espoo (FI); Vesa Starck, Helsinki (FI); Mikko Tapio Kokkonen, Helsinki (FI); Gerardo Moreno Crespo, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 300 days.

(21) Appl. No.: 17/420,303

(22) PCT Filed: Jan. 7, 2019

(86) PCT No.: PCT/EP2019/050263
§ 371 (c)(1),
(2) Date: Jul. 1, 2021

(87) PCT Pub. No.: WO2020/143902
PCT Pub. Date: Jul. 16, 2020

(65) Prior Publication Data
US 2022/0094464 A1 Mar. 24, 2022

(51) Int. Cl.
*H04L 27/06* (2006.01)
*H04L 1/00* (2006.01)
(Continued)

(52) U.S. Cl.
CPC .............. *H04L 1/005* (2013.01); *G06N 3/08* (2013.01); *H04L 1/0026* (2013.01);
(Continued)

(58) Field of Classification Search
CPC ..... H04L 1/005; H04L 1/0026; H04L 1/0036; H04L 1/1864; H04L 1/0047; G06N 3/08; G06N 3/045; H04W 76/28
(Continued)

(56) References Cited

U.S. PATENT DOCUMENTS

2013/0232097 A1* 9/2013 Shiv .................. G06N 3/08
706/20

FOREIGN PATENT DOCUMENTS

| CN | 106022521 | * | 10/2016 |
| GB | 2398976 | * | 2/2003 |
| JP | WO2015083199 | * | 6/2015 |

OTHER PUBLICATIONS

International Search Report and Written Opinion dated Sep. 27, 2019 corresponding to International Patent Application No. PCT/EP2019/050263.

(Continued)

*Primary Examiner* — Helene E Tayong
(74) *Attorney, Agent, or Firm* — SQUIRE PATTON BOGGS (US) LLP

(57) ABSTRACT

There is provided a solution for employing a neural network in a radio receiver. According to an aspect, a method comprises: acquiring, from a received frame, a set of samples associated with a position of a control information element in the frame; inputting the set of samples to nodes of an input layer of a neural network, the input layer having the same number of nodes as a number of samples in the set of samples; processing the set of samples in the neural network that has been trained, before receiving the set of samples, to decode one or more determined values of the control information element and to detect discontinuous transmission; outputting, in an output layer of the neural network, an indicator indicating a decoded value of the control information element comprised in the set of samples or an indicator indicating the discontinuous transmission.

20 Claims, 6 Drawing Sheets

(51) Int. Cl.
  *G06N 3/08* (2023.01)
  *H04L 1/1829* (2023.01)
  *H04W 76/28* (2018.01)
(52) U.S. Cl.
  CPC .......... *H04L 1/0036* (2013.01); *H04L 1/1864* (2013.01); *H04W 76/28* (2018.02)
(58) Field of Classification Search
  USPC ........................................................ 375/340
  See application file for complete search history.

(56) References Cited

OTHER PUBLICATIONS

Notification of Transmittal of the International Preliminary Report on Patentability & International Preliminary Report on Patentability dated Apr. 7, 2021.
O.A. Morozov et al., "Neural Network Detection and Decoding of PSK Signals," Communications, Control and Signal Processing, 2008. ISCCSP 2008, IEEE, Mar. 12, 2008, pp. 292-294, XP031269080.
Tobias Gruber et al., "On Deep Learning-Based Channel Decoding," 2017 51st Annual Conference on Information Sciences and Systems (CISS), IEEE, Mar. 22, 2017, pp. 1-6, XP033096118.

* cited by examiner

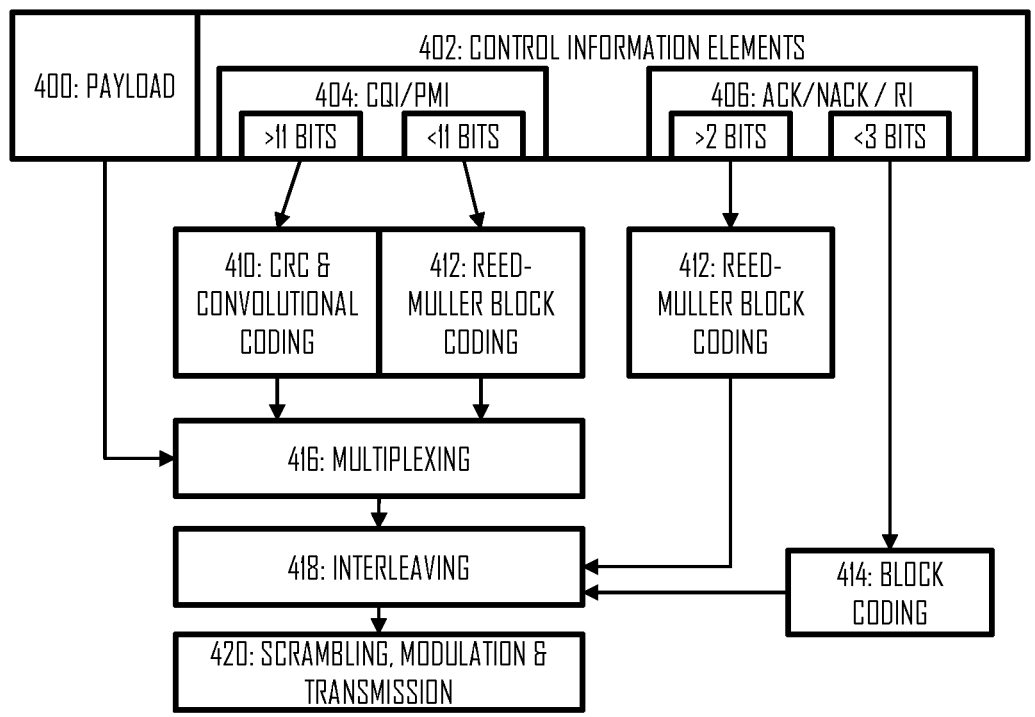
Fig 2
Fig 4

DETECTING CONTROL INFORMATION COMMUNICATED IN FRAME USING A NEURAL NETWORK

TECHNICAL FIELD

The invention relates to communications in a wireless communication system and, in particular, to detecting control information communicated in an uplink or a downlink frame.

BACKGROUND

Control information may carry various information related to management of a radio link. In modern cellular communication systems, the control information may comprise, for example, an acknowledgment message (ACK/NAK) acknowledging reception of a frame, channel quality information (CQI) reporting quality of a radio channel of the radio link, a rank indicator (RI) indicating a rank of the radio channel, etc. The control information is typically encoded in a transmitter and decoded in a receiver by mapping received control information symbols, corrupted by noise in the radio channel, into a nearest code word by using a maximum likelihood criterion, for example.

BRIEF DESCRIPTION

According to an aspect, there is provided the subject matter of the independent claims. Some embodiments are defined in the dependent claims.

According to an aspect, there is provided an apparatus comprising means for performing: acquiring, from a received frame, a set of samples associated with a position of a control information element in the frame; inputting the set of samples to nodes of an input layer of a neural network, the input layer having the same number of nodes as a number of samples in the set of samples; processing the set of samples in the neural network that has been trained, before receiving the set of samples, to decode one or more determined values of the control information element and to detect discontinuous transmission; outputting, in an output layer of the neural network, an indicator indicating a decoded value of the control information element comprised in the set of samples or an indicator indicating the discontinuous transmission.

In an embodiment, the output layer comprises a number of nodes equal to the possible outputs of the neural network.

In an embodiment, the means are configured to output a non-zero value only in one of the nodes of the output layer and to output a zero value in the other node or nodes of the output layer.

In an embodiment, the set of samples comprise modulation symbol samples, and wherein the neural network is configured to decode the one or more determined values of the control information element from the modulation symbol samples.

In an embodiment, the neural network comprises only two layers between the input layer and the output layer: a first layer coupled to an output of the input layer and comprising a number of nodes equal to the number of nodes in the input layer; and a second layer coupled between the first layer and the output layer and comprising a number of nodes equal to the number of nodes in the output layer.

In an embodiment, the neural network is fully connected.

In an embodiment, the control information element has one bit or two bits.

In an embodiment, the control information element is an acknowledgment message acknowledging reception of a frame, or a rank indicator.

In an embodiment, the neural network is trained by training inputs to the neural network, the training inputs comprising all possible values of the control information element as corrupted by simulated noise, wherein the simulated noise simulates one or more radio channel models, the training inputs further comprising discontinuous transmission training inputs.

In an embodiment, the means comprises: at least one processor; and at least one memory including computer program code, the at least one memory and computer program code configured to, with the at least one processor, cause the performance of the apparatus.

According to another aspect, there is provided a method comprising: acquiring, by a wireless device from a received frame, a set of samples associated with a position of a control information element in the frame; inputting, by the wireless device, the set of samples to nodes of an input layer of a neural network, the input layer having the same number of nodes as a number of samples in the set of samples; processing, by the wireless device, the set of samples in the neural network that has been trained, before receiving the set of samples, to decode one or more determined values of the control information element and to detect discontinuous transmission; outputting, by the wireless device in an output layer of the neural network, an indicator indicating a decoded value of the control information element comprised in the set of samples or an indicator indicating the discontinuous transmission.

In an embodiment, the output layer comprises a number of nodes equal to the possible outputs of the neural network.

In an embodiment, the neural network outputs a non-zero value only in one of the nodes of the output layer and to output a zero value in the other node or nodes of the output layer.

In an embodiment, the set of samples comprise modulation symbol samples, and wherein the neural network decodes the one or more determined values of the control information element from the modulation symbol samples.

In an embodiment, the neural network comprises only two layers between the input layer and the output layer: a first layer coupled to an output of the input layer and comprising a number of nodes equal to the number of nodes in the input layer; and a second layer coupled between the first layer and the output layer and comprising a number of nodes equal to the number of nodes in the output layer.

In an embodiment, the neural network is fully connected.

In an embodiment, the control information element has one bit or two bits.

In an embodiment, the control information element is an acknowledgment message acknowledging reception of a frame, or a rank indicator.

In an embodiment, the neural network is trained by training inputs to the neural network, the training inputs comprising all possible values of the control information element as corrupted by simulated noise, wherein the simulated noise simulates one or more radio channel models, the training inputs further comprising discontinuous transmission training inputs.

According to another aspect, there is provided a computer program product embodied on a computer-readable medium and comprising a computer program code readable by a computer, wherein the computer program code configures the computer to carry out a computer process comprising: acquiring, from a received frame, a set of samples associated with a position of a control information element in the frame; inputting the set of samples to nodes of an input layer of a neural network, the input layer having the same number of nodes as a number of samples in the set of samples; processing the set of samples in the neural network that has been trained, before receiving the set of samples, to decode one or more determined values of the control information element and to detect discontinuous transmission; outputting, in an output layer of the neural network, an indicator indicating a decoded value of the control information element comprised in the set of samples or an indicator indicating the discontinuous transmission.

One or more examples of implementations are set forth in more detail in the accompanying drawings and the description below. Other features will be apparent from the description and drawings, and from the claims.

BRIEF DESCRIPTION OF DRAWINGS

In the following some embodiments will be described with reference to the attached drawings, in which

FIG. 2 illustrates transfer of a control information element from a transmitter to a receiver;

FIG. 4 illustrates a procedure for processing control information elements in the transmitter;

DETAILED DESCRIPTION OF SOME EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
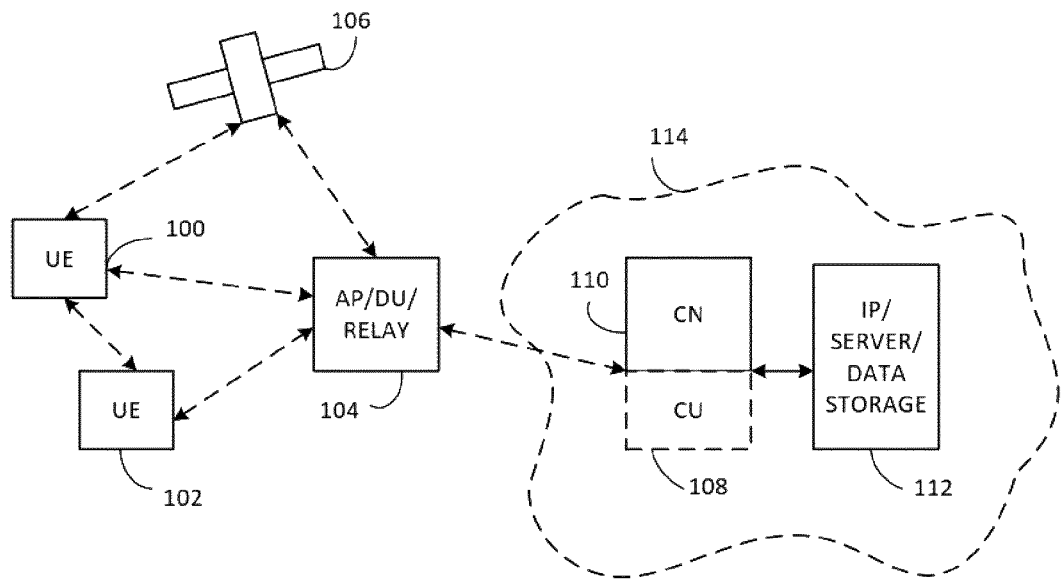
FIG. 1 illustrates an example of a wireless network to which embodiments of the invention may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

A wireless device is a generic term that encompasses both the access node and the terminal device.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home (e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

As commonly known in connection with wireless communication systems, control or management information is transferred over a radio interface, e.g. between the terminal device 100 and the access node 104. The control information may include various information such as those pieces of control information described in Background. FIG. 2 illustrates a basic block diagram of a process for transferring a code word X representing a value of a control information element. The code word X is encoded in a transmitter 300 and allocated a dedicated location in a transmission resource block. The transmitted control information element is then delivered to a receiver 304 through a radio channel 302, wherein the radio channel corrupts the transmitted control information element with noise. The noise characteristics are dependent on a distance between the transmitter and the receiver, velocities of the transmitter and receiver, and obstacles between the transmitter and receiver, among other factors. Several radio channel models have been designed to simulate how the channel modifies a transmitted signal.

Conventionally, each piece of control information is subjected a separate decoding in the receiver 304, wherein the decoding is a counter operation to the encoding in the transmitter. An output of the decoder is an estimate of the code word X. For example, when a control information element is encoded by using Reed-Muller block encoding, the receiver may employ a Reed-Muller block decoder to decode the control information element. For a convolution-encoded control information element, a Viterbi decoder may be employed. Further, there may be situations where the transmitter cannot transmit a control information element in the dedicated location, thus resulting in discontinuous transmission (DTX) in the dedicated location. The unexpected DTX should be detected correctly in the receiver in order to avoid a false detection of noise or payload data as a control information element. Conventionally, separate DTX detection is employed.

Figure 3:
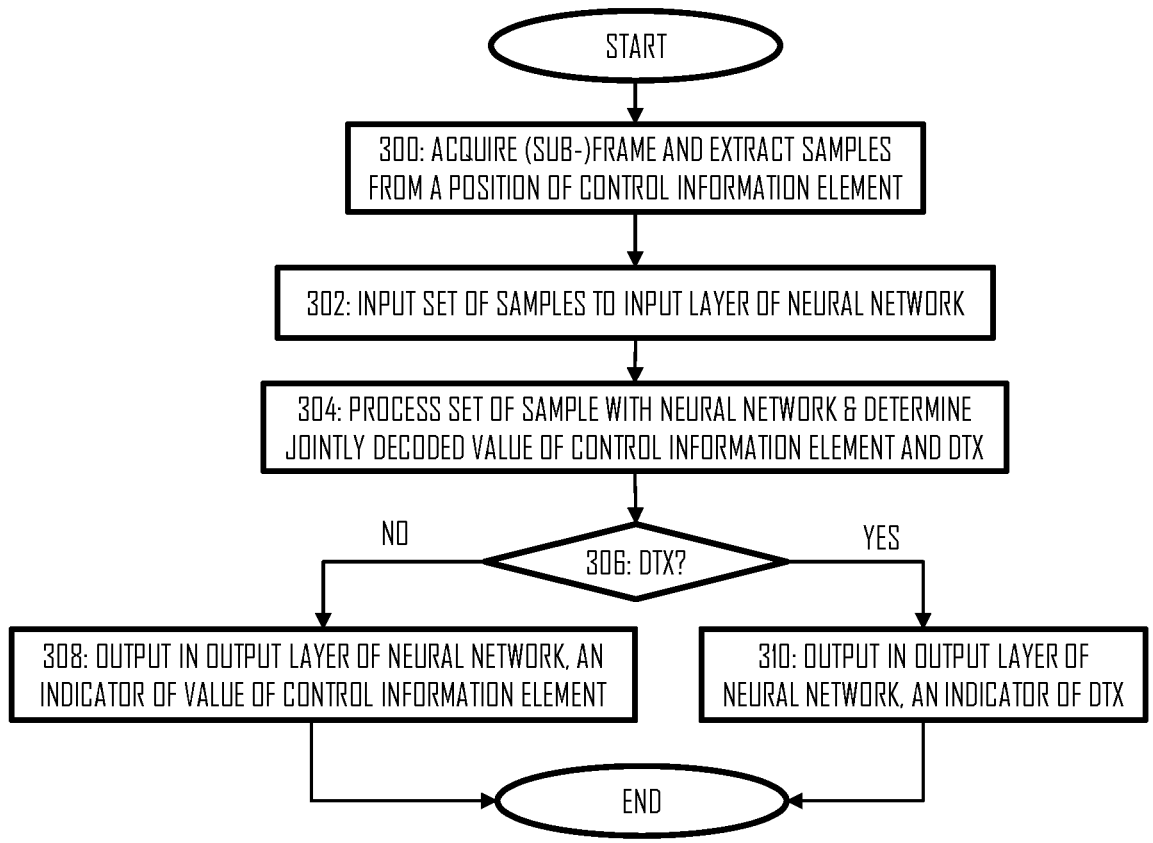
FIG. 3 illustrates an embodiment for performing joint decoding of a control information element and detection of discontinuous transmission.

The present invention employs a neural network to perform the decoding of a control information element and DTX detection jointly. FIG. 3 illustrates an embodiment of such a process carried out in a wireless device receiving the control information element through a radio channel. The wireless device may be the access node in which case the control information is uplink control information. However, the principles of the invention are applicable to downlink control information as well, wherein the wireless device is the terminal device.

Referring to FIG. 2, the process comprises: acquiring (block 300) a frame and extracting from the frame a set of samples from a position of a control information element; inputting (block 302) the set of samples to nodes of an input layer of a neural network, the input layer having the same number of nodes as a number of samples in the set of samples; (block 304) processing the set of samples in the neural network that has been trained, before receiving the set of samples, to decode one or more determined values of the control information element and to detect discontinuous transmission; outputting, in an output layer of the neural network, an indicator indicating a decoded value of the control information element comprised in the set of samples (block 308) or an indicator indicating the discontinuous transmission (block 310).

In an embodiment, the neural network determines in block 306 whether the set of samples contain the control information element or DTX. If the control information element is discovered in the set of samples, the process proceeds to block 308. If the set of samples is detected to contain the DTX, the process proceeds to block 310.

FIG. 4 illustrates uplink control information (UCI) elements according to 3GPP specifications. UCI on a physical uplink shared channel (PUSCH) contains channel quality information (CQI) 404, precoding matrix Indicator (PMI) 404, rank indicator (RI) 406 and acknowledge/non-acknowledge (ACK/NACK) 406. ACK/NACK belongs to hybrid automatic repeat request that is a block retransmission method for prevent loss of transport blocks. When the UCI is transmitted on the PUSCH, channel coding, scrambling and modulation for ACK/NACK, RI and CQI/PMI are carried out separately for each piece of control information before multiplexing them into the same symbol block. ACK/NACK is punctured into payload data 400 at a predetermined location next to a demodulation reference signal (DRS) in an uplink sub-frame. CQI/PMI are placed at the beginning of the data 400. The number of punctured resource elements (RE) depends on the number of ACK/NACK bits and the employed modulation scheme. A resource block is used to describe a group of RE spanning 12 consecutive subcarriers in a frequency domain and one time slot in a time domain.

Four different channel coding approaches are applied for UCI on the PUSCH, as depicted in FIG. 4. If the length of the CQI/PMI 404 is less than 11 bits, only Reed-Muller channel coding 412 is performed (32 input, $2^{11}$ output). If the length of CQI/PMI is greater than 11 bits, a convolutional coder 410 is used (rate=⅓), then rate matching operation is executed. When CQI/PMI channel coding is performed, the output of the encoders is multiplexed 416 with a vector of bits from payload data 400 such as application data.

RI and CQI/PMI may be provided in the same sub-frame or different sub-frames on the PUSCH, since the CQI/PMI is calculated on the basis of simultaneously (same subframe) or previously reported rank (different sub-frames).

Each positive ACK is encoded as a binary 1 and each NACK as 0. HARQ feedback encoding is dependent on the number of information bits in an ACK/NACK bundle, i.e. number of acknowledgments transmitted simultaneously. Coding for one-bit ACK/NACK and RI is done by repetition coding in block 414. For two-bit ACK/NACK and RI, simplex coding 414 is used with optional circular repetition of the encoded data. Those coding techniques are used to maximize the Euclidian distance of data symbols in modulation schemes such as quadrature phase shift keying (QPSK), 16 quadrature amplitude modulation (QAM) and 64QAM, representing two, four and six coded bits respectively. Longer ACK/NACKS (more than two bits) may be subjected to the Reed-Muller Block coding 412.

In a channel interleaving block 418, the coded RI and ACK/NACK channel coded bits are inserted into predefined column positions, and block interleaving is carried out by filling an array by rows and reading it by columns, for example. The interleaved bits are then scrambled using a UE-specific pseudo-random sequence, modulated using QPSK, 16QAM, 64QAM or 256QAM configured by higher layers, to form complex-valued symbols. The next step is a transform precoding function by using a digital Fourier transform, followed by a mapping to resource elements (sub-carriers) and generation of a complex-valued time-domain transmission signal for each antenna port. 3GPP specifications define single-carrier frequency-division multiple access (SC-FDMA) is an access scheme. In downlink orthogonal frequency-division multiple access (OFDMA) is employed.

In the receiver 304 for the PUSCH channel, an inverse SC-FDMA operation is performed by using the DFT, thus bringing the received signal to frequency domain. Subsequently, resource element demapping is performed. Reference symbols are extracted and passed to a channel and noise estimator. Signal samples are equalized using thus estimated channel and, in the case of using more than a single antenna, antenna combining may be performed. Then, the signal is transformed into the time-domain signal by inverse DFT, followed up by a resource block demapping. As a result of the resource block demapping, sets of complex-valued symbols representing the UCI elements may be acquired.

In addition to the PUSCH, UCI may be transmitted on a physical uplink control channel (PUCCH), and similar operations described above may be carried out for the PUCCH as well. With respect to the downlink, downlink control information (DCI) may be transmitted on a physical downlink control channel (PDCCH). Regarding the DCI or other forms of control information, other coding schemes and transmission functions may be employed.

As described above in connection with FIG. 3, the present invention relates to decoding of the control information element and DTX detection by adopting a machine learning approach to achieve the required performance with a low computational complexity and without knowledge of channel and noise conditions. Compared with conventional decoders and DTX detection schemes that are based on mathematical model and information theory, the machine learning architecture, such as the neural networks, does not require an expert knowledge as it learns the design directly from training data. After training the neural network decoder, the decoding process becomes simple with a low latency. A configurable multi-layer neural network architecture can learn from different types of input training data to output a value of the control information element or a DTX output in a reliable way. The neural network topology and weights may be configured depending on the type of the control information that needs to be decoded, and more of the configuration is described below in connection with training the neural network. The neural network is also capable of finding an estimate of the control information element or DTX by passing each layer of the neural network only once, thus enabling low-latency implementations also called one-shot decoding.

Figure 5:
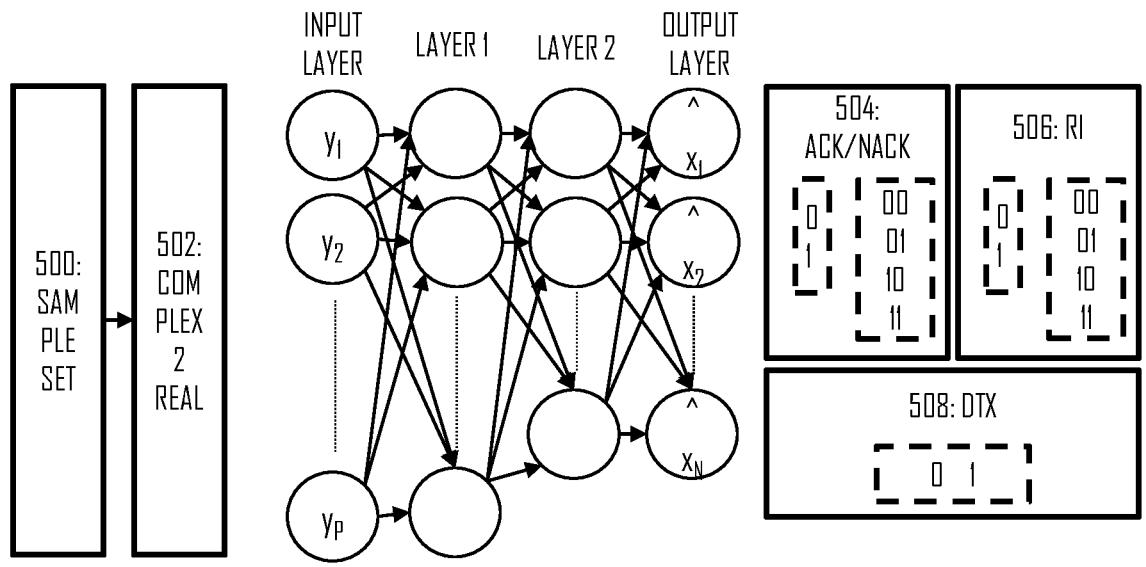
FIG. 5 illustrates a neural network configured to perform the joint decoding of a control information element and detection of discontinuous transmission according to some embodiments of the invention.

Let us then describe the structure and operation of the joint neural network decoder and DTX detector with reference to FIG. 5. Let us denote a received set of samples 500 representing a control information element extracted from a received frame by:

$$y_k = Hq + n \quad (1)$$

where $y_k$ represents the set of samples 500 from a position of a control information element in the received frame, H represents a channel matrix describing the radio channel, q comprises the encoded transmitted symbols of the control information element (if any is present in the frame), and n represents noise. The set of samples may consist of complex-valued samples. Standard machine-learning and neural network tools employ real-valued samples and, therefore, the set of complex-valued samples may be converted into a set of real-valued samples (block 502). The set of samples $y_k$ in Equation (1) may be considered to be a stack of real and imaginary parts of the complex-valued set of samples and, therefore, if the number of complex-valued samples in the set is P, the number of real-valued samples in $y_k$ is 2P.

The set of real-valued samples may then be input to the input layer of the neural network, as described above. The input layer may have 2P nodes, one for each input sample.

In an embodiment, the output layer of the neural network comprises a number of nodes equal to the possible outputs of the neural network. FIG. 5 illustrates on the right hand side some possible outputs of the neural network. For example, since the neural network is configured to detect the DTX, one possible output is the DTX output 508. When the neural network is configured to detect a one-bit control information element such as one-bit ACK/NACK 504 or one-bit RI 506, two possible outputs are realized by the possible values of the one-bit control information element: one output for bit value '0' and one output for bit value '1'. When the neural network is configured to detect a two-bit control information element such as two-bit ACK/NACK 504 or two-bit RI 506, four possible outputs are realized by the possible values of the two-bit control information element: one output for each bit value of '00', '01', '10', '11'. To summarize, when the neural network is configured to detect jointly the one-bit control information element and the DTX, the number of possible outputs and the number of nodes in the output layer is three. When the neural network is configured to detect jointly the two-bit control information element and the DTX, the number of possible outputs and the number of nodes in the output layer is five. In general, the number of nodes in the output layer is $2^T + 1$ where T is the number of bits in the control information element the neural network is configured to decode.

The output layer may be configured to output a non-zero value only in one of the nodes of the output layer and to output a zero value in the other node or nodes of the output layer. The output layer may thus be configured to output a "one-hot vector". Tables 1 and 2 below illustrate one possible one-hot coding method for the output layer for one-bit control information element (Table 1) and two-bit control information element (Table 2).

TABLE 1

| Transmitted | One-hot Encoding Label |
|---|---|
| 0 | 001 |
| 1 | 010 |
| DTX | 100 |

TABLE 2

| Transmitted | One-hot Encoding Label |
|---|---|
| 00 | 00001 |
| 01 | 00010 |
| 10 | 00100 |
| 11 | 01000 |
| DTX | 10000 |

One way of understanding the output of the neural network is that, as a response to the input set of samples in the input layer, only one "lamp" is lit in the output layer, and the lamp that is lit indicates the detection of the DTX or the value of the control information element in the input set of samples by using the one-hot encoding label in Table 1 or 2. Thanks to the mapping between the one-hot label and the transmitted value in the Table 1 or 2, the value of the control information element or the DTX may be determined.

In an embodiment, the output layer is configured to output the one-hot vector by using an activation function, e.g. a softmax function. The neural network may inherently output values that represent a probability for each possible output, i.e. the output layer may, without the activation function, output a non-zero value in each output node, the value representing the probability of the corresponding output. The activation function may select the one, most probable value amongst the output values and set the selected output as the non-zero value and set the other outputs as zeros to realize the one-hot output vector. One example of the softmax activation function is the following function: $e^{z_j}/\Sigma e^{z_j}$, where $z_j$ represent values of the output vector before the activation function and j is the number of nodes in the output layer, e.g. three or five depending on the length of the control information element being decoded. Another example of the activation function would be $max(0, z_j)$ where the highest probability value is selected.

Let us then describe the internal structure and operation of the neural network according to some embodiments. In an embodiment, the neural network comprises only two layers between the input layer and the output layer: a first layer coupled to an output of the input layer and comprising a number of nodes equal to the number of nodes in the input layer; and a second layer coupled between the first layer and the output layer and comprising a number of nodes equal to the number of nodes in the output layer. The inventors have discovered that two layers provides good combination of high performance and low complexity, in particular for short control information elements (one or two bits). A higher number of layers may not provide additional performance improvement but may increase complexity.

In an embodiment, the neural network is fully connected, as illustrated in FIG. 5. The fully connected means that every node of a layer is connected to every node in a previous and subsequent layers. For example, every node in the input layer is coupled to every node in Layer 1, every node in Layer 1 is coupled to every node in Layer 2, and every node in Layer 2 is coupled to every node in the output layer.

In the neural network, an output of a layer is an input to the next layer. For example, an output of the input layer serves as an input to Layer 1, an output of the Layer 1 serves as an input to Layer 2, and an output of the Layer 2 serves as an input to the output layer. Each node in a layer may be considered as a neuron that uses a non-linear activation function σ(.) which gives the neuron the learning ability. The layers may thus be described by the following Equations.

$$a_1 = y_k \quad (2)$$

Equation (2) represents the input layer to which the set of input samples $y_k$ is input. Layer 1 may be defined by:

$$a_{l+1} = \sigma_l(W_l a_l + b_l) \quad (3)$$

$W_l$ and $b_l$ are a weight parameter and a bias parameter, respectively, and $a_l$ is the input to the layer l. For Layer 1 in FIG. 1, l=1, and l=2 for Layer 2. The output layer may be modelled as:

$$\hat{x}_k = \sigma_L(W_L a_L + b_L) \quad (4)$$

where L represents the maximum value of l, and the function $\sigma_L$ may be the activation function described above for realizing the one-hot output vector.

Layer 1 and Layer 2 may be considered as hidden layers because their activation functions $\sigma_l$ are achieved through training. The weight parameter $W_l$ and the bias parameter $b_l$ for each node of the hidden layers is found during the training. Let us then describe some embodiments for carrying out the training that is one key element in configuring the neural network for high performance.

In an embodiment, the input to the neural network is demodulated soft symbol values or log-likelihood ratios. In another embodiment, the neural network is trained to perform the demodulation as well, in which case the input is a set of modulated symbol values.

In an embodiment, the neural network is trained by training inputs to the neural network, the training inputs comprising: all possible values of the control information element to be decoded by the neural network, corrupted by simulated noise that simulates one or more radio channel models; and DTX training inputs carrying no control information element. The DTX training input may comprise pure noise samples or payload data samples. The training may comprise a training phase and a testing phase. The training may be carried out offline, i.e. the training may be carried out before any real transmission of the control information elements. Let us now describe the training phase with reference to FIG. 6A.

Figure 6B:
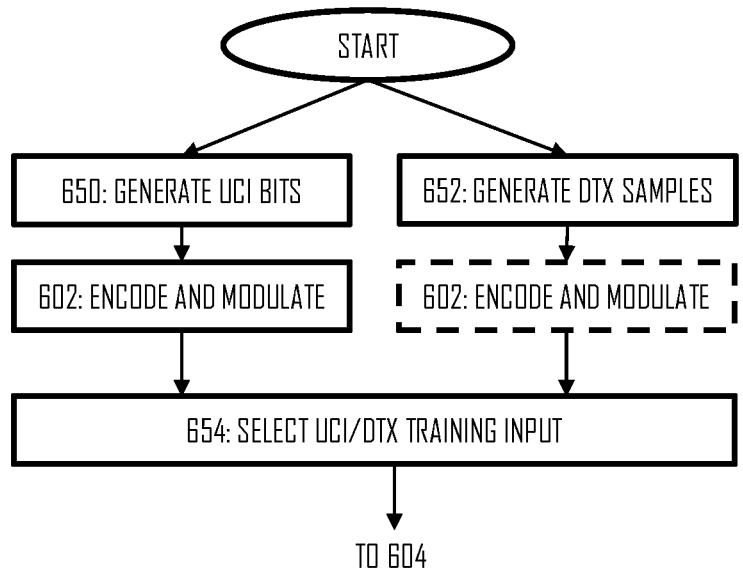
FIGS. 6A and 6B illustrate processes for training a neural network according to an embodiment of the invention.
Figure 6A:
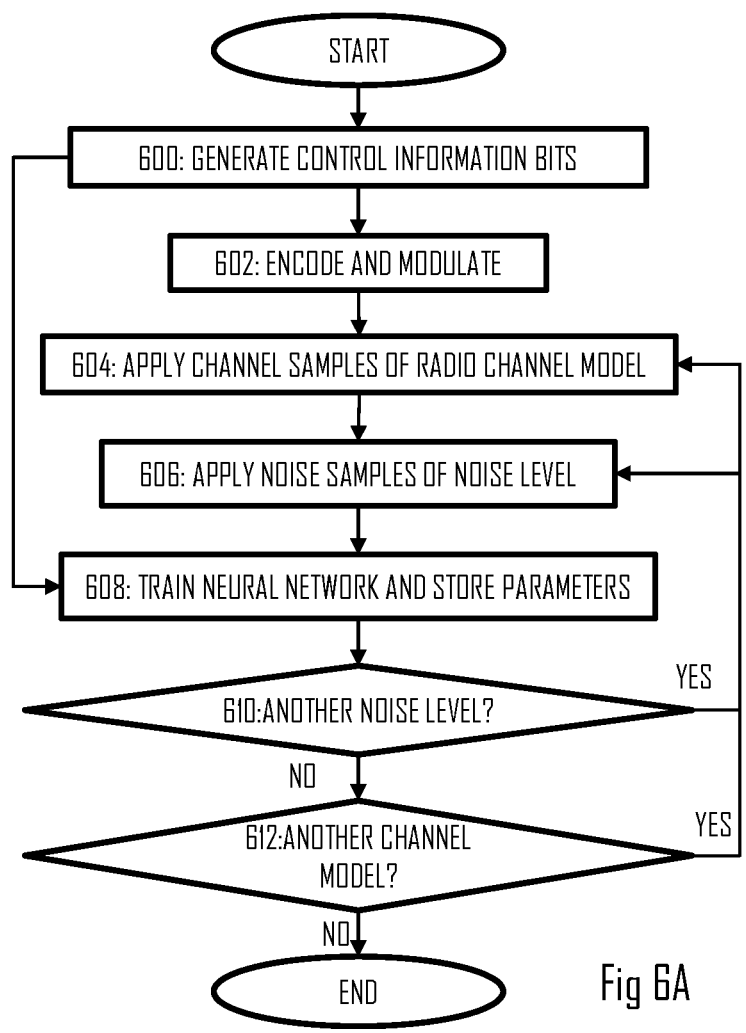

Referring to FIG. 6A, control information bits to be decoded is generated in block 600. The output of block 600 may be a one-bit or two-bit control information element, for example. The control information element is then encoded and modulated in block 602 according to the system specifications that would be used in real transmission of the control information element. The output of block 602 may be samples of one or more modulated symbols of the control information element. In the embodiment where the neural network does not perform the demodulation, the modulation may be omitted from block 602, or a separate demodulation step may be provided between blocks 606 and 608. In block 604, the samples of the modulated symbol(s) are modified by samples of a selected radio channel model. Table 3 below lists a number of possible channel models that simulate real radio channels and may be used for training the neural network. In block 604, noise samples are applied to the samples to realize a selected signal-to-noise ratio (SNR) to the samples.

Now, with the knowledge of the true value of the control information element, as input from block 600, the neural network may be trained in block 608 to select the weight parameters and the bias parameters for the nodes of the hidden layers such that the control information element is extracted from the output samples of block 606. The process may employ a performance metric to determine the performance of the neural network during execution of block 608. An example of the performance metric is a loss function that is a measure of a difference between the output of the neural network and an expected output of the neural network (the output of block 600). The loss function may be computation of a performance metric of the neural network, e.g. a mean square error or binary cross-entropy between the output and the expected output of the neural network. The set of weight parameters and the bias parameters that provide the best performance metric may be selected and the parameters may be stored in block 608.

An example of the loss function is:

$$f_u(x_k, \hat{x}_k) = -\frac{1}{K} \sum_i [x_k \log(\hat{x}_k) + (1 - x_k)\log(1 - \hat{x}_k)] \quad (5)$$

where $x_k$ is the expected output of the neural network (transmitted value), and $\hat{x}_k$ is the output of the neural network. K is the total number of outputs considered.

In an embodiment, a performance threshold may be set that sets a minimum performance requirement for the neural network. In other words, the selection of the best performance metric alone may not be sufficient but that the best performance metric shall also provide performance that meets a threshold level defined by the performance threshold. 3GPP specifications define performance requirements that are represented by a minimum SNR to reach a missed detection probability of 1%. The design rule for the neural network is thus to provide equal missed detection probabilities for erroneously detecting DTX as a control information element value (e.g. as ACK) and for erroneously detecting one value of the control information element as another value of the control information element (e.g. ACK→NACK):

$$P(DTX \to ACK) = P(ACK \to NACK) \quad (6)$$

By assuming that a probability P(ACK→NACK) for detecting ACK erroneously as NACK is negligibly small, the following approximations can be made:

$$P(ACK \to DTX) \sim P(ACK \to NACK)$$

$$P(DTX \to ACK) \sim P(DTX \to NACK) \quad (7)$$

A false alarm rate (FAR) may then be computed as a function of the missed detection probability:

$$FAR = P(DTX \to ACK) + P(DTX \to NACK) = 2* \\ P(ACK \to DTX) = 2*P(ACK \to NACK) = 2* \\ P(DTX \to ACK) = 2*MDP \quad (8)$$

where MDP denotes the missed detection probability in Equation (6).

Now, the false alarm rate sets a more strict requirement for the performance of the neural network and, as a consequence, the loss function may be modified to include a weighting parameter in the form of a weighting matrix. Equation (5) may then be modified into a following form:

$$f_{wu}(x_k, \hat{x}_k) = -\frac{1}{K} \sum_i w_i * f_u(x_k, \hat{x}_k) \quad (9)$$

The weighting matrix may have the size of $2^\alpha+1$ where $\alpha$ is the length of the control information element in bits and have the following structure:

$$w = \begin{pmatrix} 1 & \cdots & 1 \\ \vdots & \ddots & \vdots \\ \alpha & \cdots & \alpha \end{pmatrix} \quad (10)$$

Thereafter, the next noise level may be selected in block 610 and another training iteration may be performed by returning to execute blocks 606 and 608 with the next noise level. When all the noise levels for the radio channel model have been trained to the neural network and corresponding best parameters discovered and stored, the process may proceed from block 610 to block 612 for selecting the next radio channel model to be trained to the neural network. In this manner, the neural network may be trained to detect the control information element output from block 600 in various radio channels with various noise levels. When all the radio channels and the noise levels have been trained to the neural network, the process may end.

3GPP specifications define some specifications that may be used in the training. Table 3 below illustrates some channel models and noise levels that may be trained to the neural network.

TABLE 3

| Channel Model | Velocity of UE | Noise (SNR) |
|---|---|---|
| AWGN | 0 | −10 to +10 dB with +2 dB increments |
| EPA (pedestrian) | 3 | |
| EVA (vehicular) | 30 | |
| ETU (urban) | 70 | |
| HST (high-speed) | 120 | |

The process of FIG. 6A may be executed for multiple possible values of the control information element. Additionally, the process may be executed for a number of DTX samples. FIG. 6B illustrates an embodiment of blocks 600 and 602. When training the neural network for detecting the DTX, DTX samples may be generated in block 600, in addition to the values of the control information element. In FIG. 6B, the (uplink) control information (UCI) element bits are generated in block 650, and DTX samples are generated in block 652. The DTX samples may comprise noise samples or randomly generated bits. Blocks 650 and 652 thus represent an embodiment of block 600. Accordingly, the blocks 650, 652 may comprise building a training data set comprising a sequence of DTX sample sets and control information element sample sets. The control information elements may be encoded and modulated in block 602. The DTX samples may be encoded and modulated in the case where they comprise the randomly generated bits. In case of noise samples, block 602 may be omitted.

The training may be carried out for multiple DTX sample sets and multiple sets of the control information element values, and the DTX sample sets and control information value sample sets may be provided in an alternating sequence, e.g. one DTX sample set followed by 5 values of ACK/NACK, followed by ten DTX sample sets, etc. The sequence may be selected in block 654. In an embodiment, at least 50% of the training data set are DTX sample sets. For example, if the control information element is a one-bit indicator and the training of FIG. 6 is repeated N times for each value of the control information element, the number of DTX training events is at least 2N. In an embodiment, the total number of training data sample sets (DTX, different control information values) is higher than 10000 to provide sufficient training statistics.

When the training by using the process of FIG. 6 is complete, there is a number of parameter sets stored (block 608), each parameter set optimized to detect a specific control information element under a presence of a given channel model and noise level.

Figure 7:
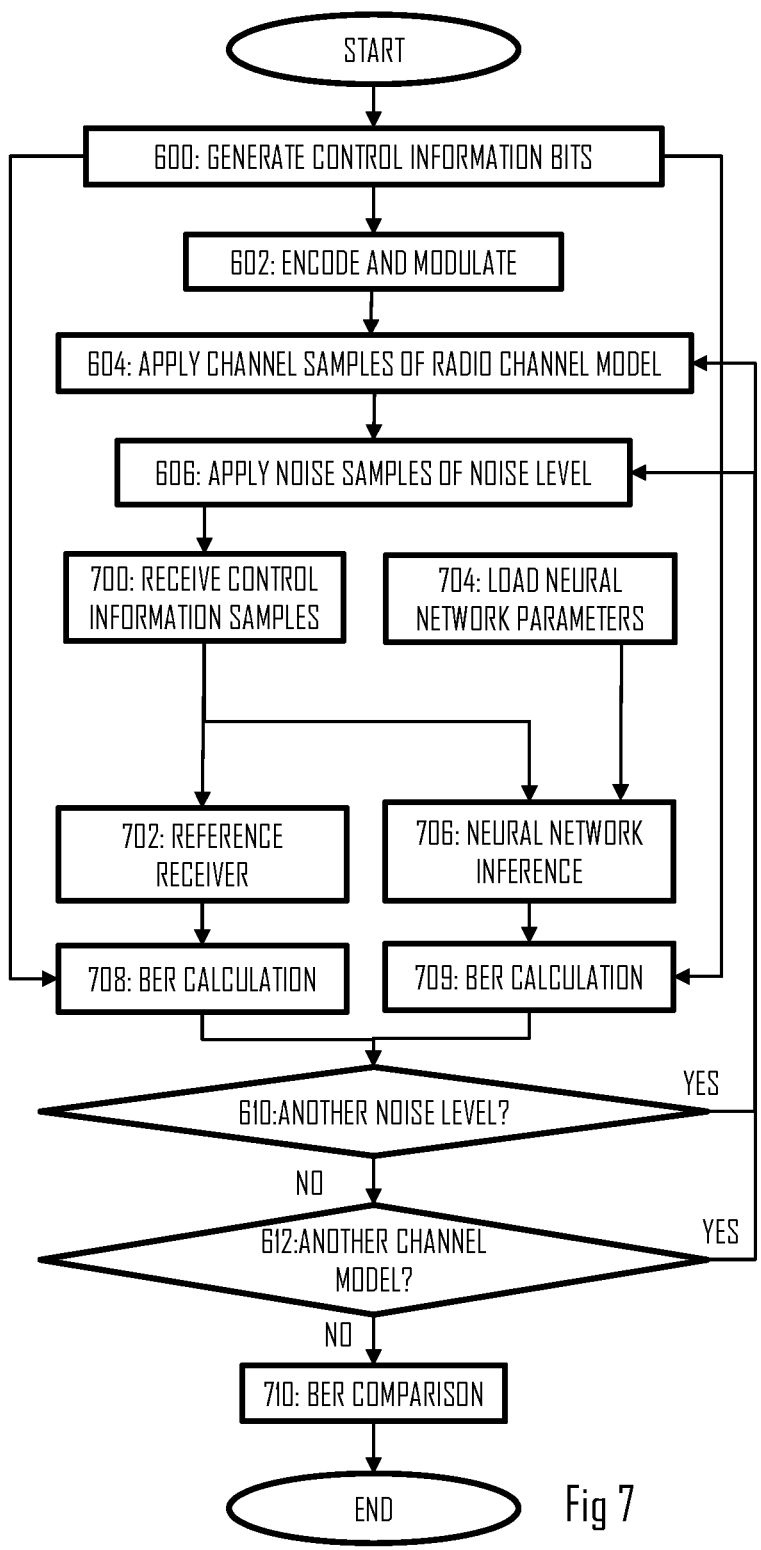
FIG. 7 illustrates a process for testing a neural network according to an embodiment of the invention.

Let us then describe the testing phase with reference to the embodiment of FIG. 7. The blocks having the same reference number as in FIG. 6 represent the same or substantially similar functions. In the embodiment of FIG. 7, after the channel model samples and noise has been added to the control information element symbol or DTX samples output from block 602, the samples represent received control information (or DTX) samples corrupted by noise and radio channel. These samples are the input to the neural network and to a reference receiver that may be a conventional receiver (block 702) comprising a conventional decoder. Regarding the neural network, a first set of neural network parameters stored in block 608 is loaded into the neural network in block 704. These parameters may be used until the process of FIG. 7 ends. The received samples are then processed by the reference receiver in block 702, and bit error rate (BER) of the reference receiver is computed in block 708 by using the decoded output of the reference receiver and the control information element generated in block 600. The reference receiver may also be configured for DTX detection, and successful/failed DTX detection may be incorporated in the evaluation of the performance of the reference receiver. The successful/failed DTX detection may be incorporated in the BER calculation in the same manner as successful/failed bit decoding.

The received samples are also processed by the neural network (block 706) by using the loaded parameters, and the BER of the output of the neural network is computed in block 709 by using the output of the neural network and the control information element generated in block 600. The neural network may also be configured for DTX detection, as described above, and successful/failed DTX detection may be incorporated in the evaluation of the BER performance, as described in the previous paragraph for the reference receiver.

The BER values computed in blocks 708 and 709 may then be stored, and the next noise level be applied to the control information element samples in block 606. In this manner, the process may be repeated for the different noise levels and channel models in the same manner, as described above in connection with FIG. 6. Accordingly, the neural network parameters become tested with various noise levels and channel models, and the BER is computed for every channel model and noise level. The testing scenario of Table 3 may be used. When all the noise levels and channel models have been tested, the comparison between the BERs acquired with the reference receiver and the BERs acquired with the neural network configured with the parameters loaded in block 704 is compared in block 710. The comparison may include computation of a normalized validation error (NVE) defined as:

$$NVE = \frac{1}{RS}\sum_{r=1}^{R}\sum_{s=1}^{S}\frac{BER_{NN}}{BER_{RR}}$$

where R represents the number of channel models trained, S represents the number of noise values trained, $BER_{NN}$ represents the BER of the neural network acquired as an output of block 709 in each iteration, and $BER_{RR}$ represents the BER of the reference receiver acquired as an output of block 708 in each iteration. When the BER comparison is made, the result of the comparison, e.g. the NVE value, may be stored for later selection of the neural network configuration.

With the execution of the process of FIG. 7, one set of neural network parameters will be tested against the reference receiver under various channel models and various noise levels. The process of FIG. 7 may be executed for every set of neural network parameters, i.e. different neural network configurations, acquired as a result of the executions of the process of FIG. 6. Since the process is unchanged for the reference receiver, blocks 702 and 708 need not be repeated. When all the sets of neural network parameters have been tested against the reference receiver, the set of neural network parameters providing the lowest value of the NVE may be selected to be used in real decoding.

In an embodiment, when selecting the set of neural network parameters, determined selection logic may be used. For example, if the channel models include the additive white Gaussian noise (AWGN) channel, the NVEs acquired by using the AWGN channel model may be provided with a lower weight than NVEs associated with other channel models.

The above-described combined decoding and DTX detection by using the neural network provides high performance for small control information elements, e.g. one-bit or two-bit code words. When the size of the control information element is greater, more hidden layers may be needed and the complexity of the neural network may increase. However, the neural network may provide acceptable performance in decoding longer code words.

In an embodiment, e.g. when the control information element is long, the neural network may be used in the DTX detection, and the actual decoding of the control information element may be performed by a conventional decoder. In such a case, the neural network may be trained for DTX detection only. The input to the neural network would be the samples from the location of the control information element and the neural network would only detect the presence/absence of the DTX. The output layer may then have only two possible outputs: one output for DTX and another output for non-DTX. In an embodiment, the output layer of the neural network may consist of one node that indicates the DTX or non-DTX. In another embodiment, the output layer of the neural network may consist of two nodes: one indicates the DTX and the other indicates non-DTX. One-hot labelling could be as follows (TX denotes transmission of a control information element):

TABLE 4

| Transmitted | One-hot Encoding Label |
|---|---|
| TX | 01 |
| DTX | 10 |

Figure 8:
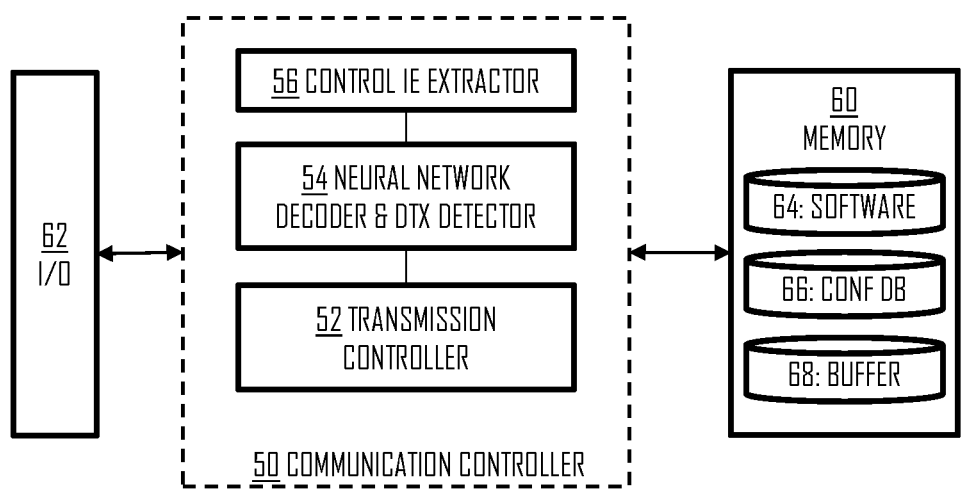
FIG. 8 illustrates an apparatus according to an embodiment of the invention.

FIG. 8 illustrates an apparatus comprising a communication controller 50, such as at least one processor or processing circuitry, and at least one memory 60 including a computer program code (software) 64, wherein the at least one memory and the computer program code (software) are configured, with the at least one processor, to cause the apparatus to carry out the process of FIG. 3 or any one of its embodiments described above. The apparatus may be for the terminal device or the access node (e.g. the gNB) or a controller controlling the operation of the access node according to the embodiments of the invention. The apparatus of FIG. 8 may be an electronic device.

Referring to FIG. 8, the memory 60 may be implemented using any suitable data storage technology, such as semiconductor based memory devices, flash memory, magnetic memory devices and systems, optical memory devices and systems, fixed memory and removable memory. The memory may comprise a configuration database 66 for storing configuration parameters, e.g. the parameters of the neural network selected as a result of the above-describe training and testing phases. The parameters may be stored beforehand to the configuration database 66, e.g. before the apparatus is first taken to use. The memory 60 may further store a data buffer 68 for data waiting for transmission and/or data waiting to be decoded.

Referring to FIG. 8, the apparatus may further comprise a communication interface 62 comprising hardware and/or software for realizing communication connectivity according to one or more radio communication protocols. The communication interface 62 may provide the apparatus with radio communication capabilities in a wireless network, e.g. a radio access network of a cellular communication system. In an embodiment, the communication interface 62 comprises one or more antenna arrays providing the apparatus with capability of forming directive transmission radio beams and the reception radio beams. The communication interface may comprise standard well-known analog radio components such as an amplifier, filter, frequency-converter and circuitries, conversion circuitries transforming signals between analog and digital domains, and one or more antennas. Digital signal processing regarding decoding of received signals may be performed in the communication controller 50.

The communication controller 50 may comprise a control information element (IE) extractor 56 configured to extract a control information element from a received frame, e.g. from one or more sub-carriers of the frame. The frame may be understood as a radio frame, a sub-frame or a time slot within a sub-frame. The frame may be a signal transmitted in a determined time-frequency resource. The control information element extracted from the received frame may comprise a set of samples from a position of the ACK/NACK or the RI, for example, although other information elements are equally possible. Upon extracting the set of samples from the received frame, the set of samples may be input to a neural network decoder and DTX detector 54, e.g. the one illustrated in FIG. 5. The entity 54 may be configured to perform joint DTX detection and the decoding on the set of samples and output an indication of the result of the decoding and DTX detection, as described above. When the result is the DTX detection, further processing related to the set of samples may be ended. When the result is a determined value of the control information element, the value may be input to a transmission controller 52 configured to perform a determined function in response to the determined value. For example, when the value indicates NACK, the transmission controller 52 may be configured to trigger a retransmission of a message. e.g. a transmission resource block. When the value indicates ACK, the transmission controller may end a HARQ process related to transmission of a message that was acknowledged by the ACK. When the value indicates a determined channel rank, the transmission controller may configure transmission parameters according to the channel rank. In a similar manner, the transmission controller may respond to the result of the decoding depending on the value of the decoded control information element.

At least some of the functionalities of the apparatus of FIG. 8 may be shared between two physically separate devices, forming one operational entity. Therefore, the apparatus may be seen to depict the operational entity comprising one or more physically separate devices for executing at least some of the processes described with respect to the access nodes. For example, an access node utilizing such shared architecture, may comprise a remote control unit (RCU) or central unit (CU), such as a host computer or a server computer, operatively coupled (e.g. via a wireless or wired network) to a remote radio head (RRH) or distributed unit (DU), such as a Transmission Reception Point (TRP), located in the access node, e.g. the gNB 104, 104A, 104B. An RCU may generate a virtual network through which the RCU communicates with an RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into a server computer or a host computer (i.e. to the RCU). External network virtualization is targeted to optimized network sharing. Another category is internal virtual networking which provides network-like functionality to the software containers on a single system. A virtual network may provide flexible distribution of operations between the RRH and the RCU. In practice, any digital signal processing task may be performed in either the RRH or the RCU and the boundary where the responsibility is shifted between the RRH and the RCU may be selected according to implementation. As an example of the shared architecture case, once a SgNB-CU has received from a MgNB a packet combining indication and scheduling window (as shown in FIG. 5, 502) it would need to communicate the indication to the MAC layer in the gNB-DU. That could be carried out in a several manner. For instance by assigning an increased packet priority or adjusted latency target to the packet overwriting the QoS information established on the F1 interface between DU and CU (as part of the F1 procedure of UE Context Setup/Modification of the DRB). Alternatively, the scheduling window could be directly provided over the F1 to the MAC.

At least some of the processes described above may be performed by the RCU or shared among the RRH and the RCU.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 7 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2 to 7 or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 2 to 7, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2 to 7 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
at least one processor; and
at least one memory including computer program code, wherein the at least one memory and computer program code are configured to, with the at least one processor, to cause the apparatus to perform:
acquiring, from a received frame, a set of samples associated with a position of a control information element in the frame;
inputting the set of samples to nodes of an input layer of a neural network, the input layer having the same number of nodes as a number of samples in the set of samples;
processing the set of samples in the neural network that has been trained, before receiving the set of samples, to decode one or more determined values of the control information element and to detect discontinuous transmission;
outputting, in an output layer of the neural network, an indicator indicating a decoded value of the control information element comprised in the set of samples or an indicator indicating the discontinuous transmission, wherein the neural network is trained by training inputs to the neural network, the training inputs comprising possible values of the control information element as corrupted by simulated noise, wherein the simulated noise simulates one or more radio channel models, the training inputs further comprising payload data samples or samples comprising randomly generated bits as a discontinuous transmission training input.

2. The apparatus of claim 1, wherein the output layer comprises a number of nodes equal to the possible outputs of the neural network.

3. The apparatus of claim 2, wherein the at least one memory and computer program code are further configured, with the at least one processor, to cause the apparatus to output a non-zero value only in one of the nodes of the output layer and to output a zero value in the other node or nodes of the output layer.

4. The apparatus of claim 3, wherein the set of samples comprise modulation symbol samples, and wherein the neural network is configured to decode the one or more determined values of the control information element from the modulation symbol samples.

5. The apparatus of claim 1, wherein the neural network comprises only two layers between the input layer and the output layer: a first layer coupled to an output of the input layer and comprising a number of nodes equal to the number of nodes in the input layer; and a second layer coupled between the first layer and the output layer and comprising a number of nodes equal to the number of nodes in the output layer.

6. The apparatus of claim 1, wherein the neural network is fully connected.

7. The apparatus of claim 1, wherein the control information element has one bit or two bits.

8. The apparatus of claim 1, wherein the control information element is an acknowledgment message acknowledging reception of a frame, or a rank indicator.

9. A method, comprising:
acquiring, by a wireless device from a received frame, a set of samples associated with a position of a control information element in the frame;
inputting, by the wireless device, the set of samples to nodes of an input layer of a neural network, the input layer having the same number of nodes as a number of samples in the set of samples;
processing, by the wireless device, the set of samples in the neural network that has been trained, before receiving the set of samples, to decode one or more determined values of the control information element and to detect discontinuous transmission;
outputting, by the wireless device in an output layer of the neural network, an indicator indicating a decoded value of the control information element comprised in the set of samples or an indicator indicating the discontinuous transmission,
wherein the neural network is trained by training inputs to the neural network, the training inputs comprising possible values of the control information element as corrupted by simulated noise, wherein the simulated noise simulates one or more radio channel models, the training inputs further comprising payload data samples or samples comprising randomly generated bits as a discontinuous transmission training input.

10. The method of claim 9, wherein the output layer comprises a number of nodes equal to the possible outputs of the neural network.

11. The method of claim 10, wherein the neural network outputs a non-zero value only in one of the nodes of the output layer and to output a zero value in the other node or nodes of the output layer.

12. The method of claim 11, wherein the set of samples comprise modulation symbol samples, and wherein the neural network decodes the one or more determined values of the control information element from the modulation symbol samples.

13. The method of claim 9, wherein the neural network comprises only two layers between the input layer and the output layer: a first layer coupled to an output of the input layer and comprising a number of nodes equal to the number of nodes in the input layer; and a second layer coupled between the first layer and the output layer and comprising a number of nodes equal to the number of nodes in the output layer.

14. The method of claim 9, wherein the neural network is fully connected.

15. The method of claim 9, wherein the control information element has one bit or two bits.

16. The method of claim 9, wherein the control information element is an acknowledgment message acknowledging reception of a frame, or a rank indicator.

17. A computer program product embodied on a non-transitory computer-readable medium and comprising a computer program code readable by a computer, wherein the computer program code configures, when read and executed by the computer, the computer to carry out a computer process comprising:
acquiring, from a received frame, a set of samples associated with a position of a control information element in the frame;
inputting the set of samples to nodes of an input layer of a neural network, the input layer having the same number of nodes as a number of samples in the set of samples;
processing the set of samples in the neural network that has been trained, before receiving the set of samples, to decode one or more determined values of the control information element and to detect discontinuous transmission;
outputting, in an output layer of the neural network, an indicator indicating a decoded value of the control information element comprised in the set of samples or an indicator indicating the discontinuous transmission,
wherein the neural network is trained by training inputs to the neural network, the training inputs comprising possible values of the control information element as corrupted by simulated noise, wherein the simulated noise simulates one or more radio channel models, the training inputs further comprising payload data samples or samples comprising randomly generated bits as a discontinuous transmission training input.

18. The computer program product according to claim 17, wherein the output layer comprises a number of nodes equal to the possible outputs of the neural network.

19. The computer program product according to claim 17, wherein the computer program code further configures the computer to output a non-zero value only in one of the nodes of the output layer and to output a zero value in the other node or nodes of the output layer.

20. The computer program product according to claim 17, wherein the set of samples comprise modulation symbol samples, and wherein the neural network is configured to decode the one or more determined values of the control information element from the modulation symbol samples.

* * * * *